United States Patent
Goubau et al.

(10) Patent No.: US 6,515,475 B2
(45) Date of Patent: Feb. 4, 2003

(54) DETERMINATION OF TRACK WIDTH OF MAGNETORESISTIVE SENSORS DURING MAGNETIC HEAD FABRICATION USING MAGNETIC FIELDS

(75) Inventors: Wolfgang Goubau, San Jose, CA (US); Arley Cleveland Marley, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 153 days.

(21) Appl. No.: 09/785,839

(22) Filed: Feb. 16, 2001

(65) Prior Publication Data

US 2002/0112343 A1 Aug. 22, 2002

(51) Int. Cl.[7] .......................... G01R 33/12; G11B 5/39
(52) U.S. Cl. ...................................... 324/210; 29/603.09
(58) Field of Search ................................ 324/210, 211, 324/212; 29/603.01, 603.07, 603.09, 603.15, 603.16

(56) References Cited

U.S. PATENT DOCUMENTS

| | | | |
|---|---|---|---|
| 3,710,235 A | 1/1973 | Barrager et al. | 324/34 R |
| 5,589,777 A | 12/1996 | Davis et al. | 324/537 |
| 5,696,445 A | 12/1997 | Inbar | 324/228 |
| 5,721,488 A | 2/1998 | Sakai et al. | 324/210 |
| 5,854,554 A | 12/1998 | Tomita et al. | 324/210 |
| 5,998,993 A | 12/1999 | Inage et al. | 324/210 |

FOREIGN PATENT DOCUMENTS

| | | |
|---|---|---|
| JP | 60171618 A | 9/1985 |
| JP | 61-80076 A | 4/1986 |
| JP | 61080077 A | 4/1986 |
| JP | 4334077 A | 11/1992 |
| JP | 06084146 A | 3/1994 |
| JP | 406150264 A | 5/1994 |
| JP | 07134811 A | 5/1995 |
| JP | 07230611 A | 8/1995 |
| JP | 08030928 A | 2/1996 |
| JP | 409081913 A | 3/1997 |
| JP | 409190611 A | 7/1997 |
| JP | 9-283578 | 10/1997 |
| JP | 410198924 A | 7/1998 |
| JP | 410283614 A | 10/1998 |
| JP | 411073612 A | 3/1999 |

OTHER PUBLICATIONS

IEEE Transactions on Magnetics, vol. 30, No. 6, Nov. 1994, "Design, Fabrication & Testing of Spin–Valve Heads for High Density Recording," by Ching Tsang, Robert E. Fontana, Tsann Lin, D.E. Heim, Virgil S. Speriosu, Bruce A. Gurney & Mason L. Williams, IBM Research Division.

*Primary Examiner*—Walter E. Snow
(74) *Attorney, Agent, or Firm*—Robert O. Guillot; Intellectual Property Law Offices

(57) ABSTRACT

In fabricating magnetic heads on a wafer surface, magnetoresistive sensors having two different stripe heights and the same stripe width are formed. Additionally, two different electronic lapping guides (ELGs) having different stripe heights and the same stripe width are also formed. While the design widths and heights of the sensors and ELGs are known, the actually fabricated widths and heights of the sensors and ELGs is unknown, due to the windage in the fabrication process. In the present invention, to determine the actual track width of the sensors, the change in electrical resistance of the sensors and ELGs is experimentally determined during the application of a magnetic field to the sensors and ELGs. Through a mathematical analysis, the actual track width of the fabricated sensors is determined utilizing the design widths and heights of the sensors and ELGs, together with the experimentally determined changes in electrical resistance of the sensors and ELGs.

11 Claims, 1 Drawing Sheet

DETERMINATION OF TRACK WIDTH OF MAGNETORESISTIVE SENSORS DURING MAGNETIC HEAD FABRICATION USING MAGNETIC FIELDS

BACKGROUND OF THE INVENTION

1. Field of the Invention

The present invention relates generally to methods for determining the track width of magnetoresistive sensors of magnetic heads at the wafer level, and more particularly to the utilization of electrical resistance measurements of the magnetoresistive sensor while applying a magnetic field to determine the track width of the sensor.

2. Description of the Prior Art

Magnetic heads are fabricated in large quantities upon wafer substrates in an expensive fabrication process involving many steps. The magnetoresistive sensor of the read head portion of the magnetic heads is fabricated early in the overall head fabrication process, and a critical parameter to magnetic head performance is the track width of the fabricated magnetoresistive sensor. Therefore, following the fabrication of the magnetoresistive sensors on the wafer substrate, efforts are undertaken to measure the fabricated track width. Where the fabricated track width of the magnetoresistive sensors is not within product design parameters, time and expense can be saved by halting further fabrication of magnetic heads on such a wafer that has magnetoresistive sensors having an unacceptable track width.

Presently, optical inspection methods are utilized to determine the track width of the fabricated magnetoresistive sensors on the wafer. However, efforts to increase the areal data storage density of magnetic disks have resulted in efforts to decrease the track width of the hard disk data tracks, such that more data tracks per inch can be written onto the magnetic disk. In conjunction therewith, the track width of the magnetoresistive sensor has likewise been reduced in order to properly read data from the narrow data tracks, and current magnetoresistive sensors are fabricated with track widths of less than 0.5 microns. At this dimension, current optical scanning methods incur substantial resolution problems in accurately determining the track width of the magnetoresistive sensors upon the wafer surface, and a non-optical method for determining the track width of the magnetoresistive sensors is desirable.

The present invention utilizes the electrical and magnetic properties of the magnetoresistive sensors to determine the track width of the magnetoresistive sensors upon the wafer, as will be understood from the detailed description that follows.

SUMMARY OF THE INVENTION

In fabricating magnetic heads on a wafer surface, magnetoresistive sensors having two different stripe heights and the same stripe width are formed. Additionally, two different electronic lapping guides (ELGs) having different stripe heights and the same stripe width are also formed. While the design widths and heights of the sensors and ELGs are known, the actually fabricated widths and heights of the sensors and ELGs is unknown, due to the windage in the fabrication process. In the present invention, to determine the actual track width of the sensors, the change in electrical resistance of the sensors and ELGs is experimentally determined during the application of a magnetic field to the sensors and ELGs. Through a mathematical analysis, the actual track width of the fabricated sensors is determined utilizing the design widths and heights of the sensors and ELGs, together with the experimentally determined changes in electrical resistance of the sensors and ELGs.

It is an advantage of the method for determining the track width of magnetoresistive sensors of the present invention that a non-optical method for determining the actual track width of the magnetoresistive sensors is provided.

It is another advantage of the method for determining the track width of magnetoresistive sensors of the present invention that the actual track width of magnetoresistive sensors can be determined where the track width is so narrow that optical track width measuring techniques are inaccurate.

It is a further advantage of the method for determining the track width of magnetoresistive sensors of the present invention that electrical measurements of sensors and ELGs can be utilized to determine the actual track width of the sensors.

It is yet another advantage of the method for determining the track width of magnetoresistive sensors of the present invention that a rapid, accurate method for determining the actual track width of the sensors is provided.

It is yet a further advantage of the method for determining the track width of magnetoresistive sensors of the present invention that the actual track width of the sensors can be rapidly determined at various locations throughout the wafer surface, such that wafer process parameters can be analyzed.

These and other features and advantages of the present invention will no doubt become apparent to those skilled in the art upon reviewing the following detailed description which makes references to the several figures of the drawings.

IN THE DRAWINGS

DETAILED DESCRIPTION OF THE PREFERRED EMBODIMENTS

Figure 1:
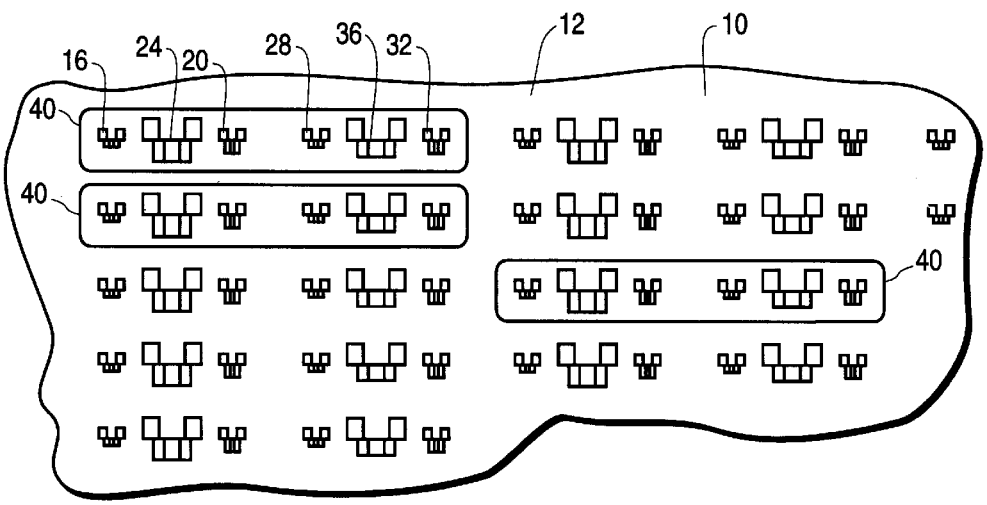
FIG. 1 is a top plan view of a wafer surface during a magnetic head fabrication process, depicting a plurality of magnetoresistive sensors and electronic lapping guides (ELGs) on the wafer surface.

Magnetic heads are fabricated in large quantities upon the surface of wafer substrates, and FIG. 1 is a top plan view of a typical prior art wafer depicting a stage in the fabrication of such magnetic heads. As depicted in FIG. 1, the devices that are being fabricated upon the surface 12 of the wafer 10 include a first magnetic head 16, a second magnetic head 20, an electronic lapping guide 24 disposed between the heads 16 and 20, a third magnetic head 28, a fourth magnetic head 32 and a second ELG 36. These devices 16, 20, 24, 28, 32, 36, form a basic cell 40 that is repeatedly fabricated across the wafer surface 12. Each of the devices 16–36 are next described with the aid of FIG. 2, which is an enlarged view of a single cell 40.

Figure 2:
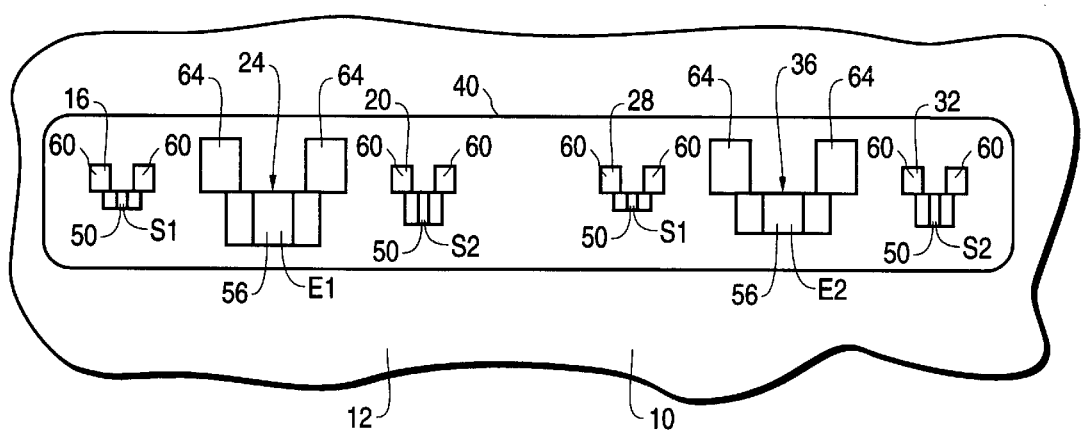
FIG. 2 is an enlarged top plan view of a portion of the wafer surface depicted in FIG. 1.

As depicted in FIG. 2, a cell 40 includes the four magnetic head devices 16, 20, 28 and 32 as well as the two ELG devices 24 and 36. In the magnetic head fabrication step depicted in FIGS. 1 and 2 a read head sensor element 50 has been fabricated within each magnetic head 16, 20, 28 and 32. Significantly, the ELG elements 56 are also composed of magnetoresistive material, and are fabricated in the same fabrication steps in which the magnetoresistive sensor elements 50 are fabricated. Thus the ELG elements 56 have the same layers and layer thicknesses as the sensors 50, although they have different width and stripe height dimensions as is discussed below. In a subsequent fabrication step electrical leads 60 are fabricated in electrical connection with the magnetoresistive sensor elements 50 of the read heads, and in the same fabrication step, electrical leads 64 are fabricated in electrical connection with the ELG magnetoresistive elements 56.

There are several significant design characteristics of the magnetoresistive elements of the heads and ELGs, including that the track width of all of the magnetoresistive sensors 50 is designed to be identical; the stripe height of the magnetoresistive sensors of magnetic heads 16 and 28 is designed to be identical, whereas the stripe height of the magnetoresistive sensors of heads 20 and 32 is designed to be identical but longer than the stripe height of the magnetoresistive sensor of heads 16 and 28. Similarly, the width of the ELG magnetoresistive elements 56 of the ELGs 24 and 36 is designed to be identical, whereas the stripe height of the magnetoresistive element of ELG 24 is designed to be larger than the stripe height of the magnetoresistive element of ELG 36. It is therefore the case that each cell 40 contains two types of heads, such as 16 and 20, that have sensors 50 having different stripe heights but the same stripe width. In the analysis that follows, the designation S1 will refer to the sensor that is formed in heads 16 and 28, and the designation S2 will refer to the sensor that is formed in heads 20 and 32. The designation $H_{S1}$ will refer to the stripe height of sensor S1, $H_{S2}$ will refer to the stripe height of sensor S2, and $W_S$ will refer to the width of the sensors S1 and S2, which width is designed to be identical. The cell 40 also contains two types of ELGs 24 and 36, and in the following analysis ELG 24 shall be referred to as E1 and ELG 36 shall be referred to as E2. The stripe height of the magnetoresistive element of E1 is designated as $H_{E1}$, the stripe height of the MR element of E2 is designated as $H_{E2}$ and the width of the MR element of both ELGs E1 and E2 is designated as $W_E$, which width is designed to be identical.

It is significant to note that all of the structures and features described hereabove with regard to FIGS. 1 and 2 are practiced in prior art wafer fabrication, and are therefore well known to those skilled in the art. A typical stripe height $H_{S1}$ for the magnetoresistive sensors of heads 16 and 28 is approximately 3 microns, a typical stripe height $H_{S2}$ for the magnetoresistive sensors of heads 20 and 32 is approximately 5 microns, the stripe height $H_{E1}$ of the magnetoresistive element 56 of ELG 24 is approximately 10.5 microns and the stripe height $H_{E2}$ of the magnetoresistive element of ELG 36 is approximately 6.5 microns. The stripe width $W_E$ of the magnetoresistive elements 56 of ELGs 24 and 36 is designed to be equal and approximately 8 microns and the track width $W_S$ of the magnetoresistive sensors 50 of the magnetic heads 16, 20, 28 and 32 is designed to be equal and approximately 0.5 microns.

As indicated hereabove, the present invention is a method for determining the fabricated track width of the magnetoresistive sensor elements 50 subsequent to their fabrication on the wafer surface utilizing the electrical resistance and magnetoresistive properties of the sensor elements.

Generally, the electrical resistance R of a fabricated device, such as E1 (that is, ELG 24), can be stated as:

$$R_{E1} = R_L + \rho_M(W_E + \delta)/(H_{E1} + \Delta H_E) \qquad \text{EQ. 1}$$

wherein $R_L$ is the resistance of the leads 64, $\rho_M$ is the resistivity of the magnetoresistive material, $W_E$ is the designed width of the magnetoresistive element 56, $\delta$ is the windage in the width, $H_{E1}$ is the stripe height of element E1 and $\Delta H_E$ is the windage in the stripe height. As is understood by those skilled in the art, windage is the term used to describe the difference between the actual dimension of a fabricated device and the design dimension of that device. Thus, for instance, $W_E$ is the design width of the magnetoresistive element 56 while $W_E + \delta$ is the actual width of the fabricated magnetoresistive element 56. Similarly, $H_{E1}$ is the design stripe height of magnetoresistive element 56 of ELG 24 and $H_{E1} + \Delta H_E$ is the fabricated stripe height of the element 56 of ELG 24.

Significantly, if a magnetic field is applied to the ELG 24 and its electrical resistance is simultaneously determined, that resistance is stated as:

$$R_{E1M} = R_L + \rho_{MM}(W_E + \delta)/(H_{E1} + \Delta H_E) \qquad \text{EQ. 2}$$

wherein $R_{E1M}$ is the resistance of the element during the application of the magnetic field, $R_L$ is the resistance of the leads (which does not change during the application of the magnetic field) and $\rho_{MM}$ is the resistivity of the magnetoresistive element 56 which does change upon the application of the magnetic field; the dimensions and windages of the element 56 do not change.

Significantly, where the difference in the electrical resistance due to the application of the magnetic field is determined, the resistance of the leads is removed from the analysis according to equation 3, as follows:

$$\Delta R_{E1} = \Delta \rho_M (W_E + \delta)/(H_{E1} + \Delta H_E) \qquad \text{EQ. 3}$$

where $\Delta R_{E1}$ is the change in electrical resistance due to the application of the magnetic field and $\Delta \rho_M$ is the change in the resistivity of the magnetoresistive element due to the application of the magnetic field; that is, $\Delta \rho_m = \rho_m - \rho_{mm}$.

Utilizing a similar analysis for E2, it can be stated that:

$$\Delta R_{E2} = \Delta \rho_M (W_E + \delta)/(H_{E2} + \Delta H_E) \qquad \text{EQ. 4}$$

Utilizing equations 3 and 4, the ELG element stripe height windage is determined as:

$$\Delta H_E = (H_{E2} \Delta R_{E2} - H_{E1} \Delta R_{E1})/(\Delta R_{E1} - \Delta R_{E2}) \qquad \text{EQ. 5}$$

and the ELG stripe width windage is reflected in the equation:

$$\Delta \rho_M (W_E + \delta) = \Delta R_{E1}(H_{E1} + \Delta H_E). \qquad \text{EQ. 6}$$

Similar equations for the sensors S1 and S2 are similarly derived; that is, $$\Delta R_{S1} = \Delta \rho_M (W_S + \delta)/(H_{S1} \Delta H_S) \qquad \text{EQ. 7}$$

$$\Delta R_{S2} = \Delta \rho_M (W_S + \delta)/(H_{S2} \Delta H_S) \qquad \text{EQ. 8}$$

wherein $\Delta R_{S1}$ is the change in resistance of sensor S1 upon the application of a magnetic field, $\Delta \rho_M$ is the change in the resistivity of the magnetoresistive material upon the application of the magnetic field (which is identical to $\Delta \rho_M$ of the ELGs E1 and E2), $\delta$ is the windage of the track width of the sensors S1 and S2, $\Delta H_S$ is the windage in the stripe height of the sensors S1 and S2 and $\Delta R_{S2}$ is the change in resistance of sensor S2 upon the application of a magnetic field thereto. The windage $\Delta H_S$ can be determined from equations 7 and 8, as is set forth in equation 9 below:

$$\Delta H_S = (H_{S2}\Delta R_{S2} - H_{S1}\Delta R_{S1})/(\Delta R_{S1} - \Delta R_{S2}) \quad \text{EQ. 9}$$

and the track width windage $\delta$ can be reflected in equation 10, which is derived from equations 7 and 8 as shown below:

$$\Delta\rho_M(W_S+\delta) = \Delta R_{S1}(H_{S1}+\Delta H_S). \quad \text{EQ. 10}$$

A reasonable assumption reflected in the analysis set forth above is that the windage $\delta$ in the width of the ELG ($W_E$) is identical to the windage $\delta$ in the width $W_S$ of the sensors S1 and S2.

As stated above, it is the goal of the present invention to determine the actual track width of the sensors S1 and S2, that is, to determine the value $W_S+\delta$, where $W_S$ is the design track width. Thus, it is necessary to determine $\delta$, which may be accomplished by determining the ratio $\beta$, where:

$$\beta = \Delta\rho_M(W_S+\delta)/\Delta\rho_M(W_E+\delta). \quad \text{EQ. 11}$$

Therefore, utilizing equations 6 and 10 it is derived that:

$$\beta = \Delta R_{S1}(H_{S1}+\Delta H_S)/\Delta R_{E1}(H_{E1}+\Delta H_E) \quad \text{EQ. 12}$$

Additionally, equation 11 can be solved for $\delta$ which yields:

$$\delta = (W_S - \beta W_E)/(\beta-1) \quad \text{EQ. 13}$$

And, as indicated above, the actual track width $TW_S$ of the magnetoresistive sensors S1 and S2 of the heads 16, 20, 28 and 32 is determined as:

$$TW_S = W_S + \delta \quad \text{EQ. 14}$$

From the preceding equations it is seen that $\delta$ is determined from equation 13 by determining the value of $\beta$ because $W_S$ and $W_E$ are known design values. The value of $\beta$ is determined from equation 12 by determining $\Delta R_{S1}$ and $\Delta R_{E1}$ which are experimentally determined values, wherein $H_{S1}$ and $H_{E1}$ are known design parameters, and wherein $\Delta H_S$ and $\Delta H_E$ are determined from equations 9 and 5. Referring to equation 9, it is seen that $\Delta H_S$ is a function of the experimental values of $\Delta R_{S2}$ and $\Delta R_{S1}$, wherein $H_{S2}$ and $H_{S1}$ are known design parameters. Likewise, from equation 5, $\Delta H_E$ is determined from the experimental values of $\Delta R_{E2}$ and $\Delta R_{E1}$, wherein $H_{E2}$ and $H_{E1}$ are known design parameters.

Therefore, where the design parameters of the sensors S1 and S2 and the ELGs E1 and E2 are known, the value of $\delta$ is experimentally determinable by measuring the change in resistance of the elements S1, S2, E1 and E2 upon the application of a magnetic field; that is, by the values $\Delta R_{S1}$, $\Delta R_{S2}$, $\Delta R_{E1}$ and $\Delta R_{E2}$.

Figure 3:
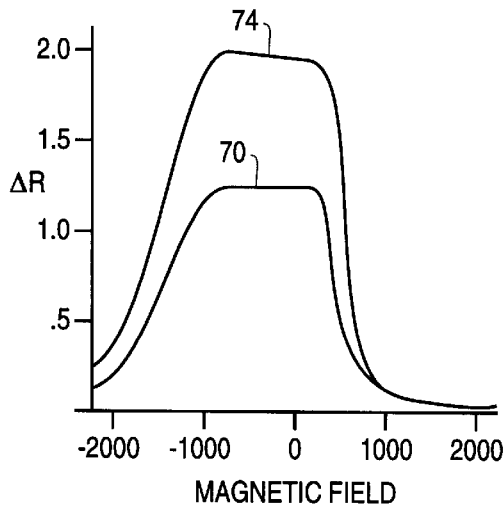
FIG. 3 is a graph depicting the change in electrical resistance of ELGs in relationship to an applied magnetic field.
Figure 4:
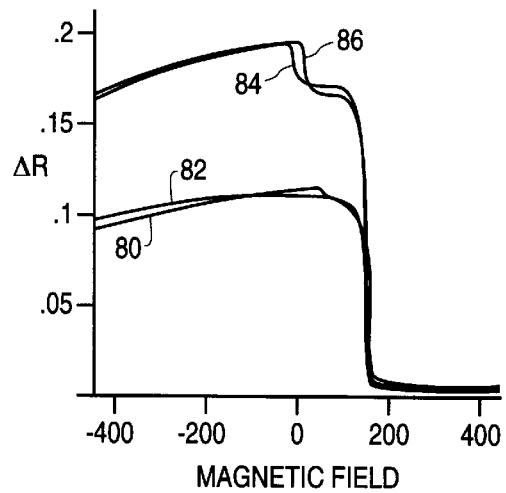
FIG. 4 is a graph depicting the change in resistance of magnetoresistive sensors in relationship to an applied magnetic field.

Therefore, with reference to FIG. 2, electrical probe tips of a testing device are applied to electrical leads, such as leads 64 of the ELG E1, and a magnetic field is swept across the magnetoresistive element 56, and the change in resistance of the element E1 is determined experimentally. In a similar manner, the change in resistance of ELG element E2 and the sensors S1 and S2 is determined. By way of example, FIG. 3 is a graphical depiction of the change in resistance of the ELG elements E1 and E2 as a magnetic field is applied. Curve 74 is associated with the shorter stripe ELG E2, and curve 70 is associated with the longer stripe ELG E1. Similarly, FIG. 4 is a graphical representation of the change in resistance of the magnetoresistive sensors of the four heads 16, 20, 28 and 32 within a cell 40. Curves 84 and 86 reflect the change in resistance of sensor S1, which is the shorter stripe magnetoresistive sensor of heads 16 and 28 within cell 40, and curves 80 and 82 represent the change in resistance of the longer stripe sensor S2 as included in heads 20 and 32 of cell 40.

It is therefore to be understood that the actual track width $TW_S$ of the sensors S1 and S2 is determined from equation 13 as the design track width $W_S$ plus the windage $\delta$, where $\delta$ is determined from known design parameters and the experimentally measured change in resistance of the sensor elements S1, S2, E1 and E2 of a cell 40 as described above. Furthermore, the actual track width $TW_S$ can be determined for the various cells 40 from differing portions of the surface of the wafer. These results can be utilized to determine whether magnetic heads that are being fabricated upon the wafer surface are within design guidelines, as well as to provide information regarding variations in process parameters across the surface of the wafer.

While the present invention has been shown and described with regard to certain preferred embodiments, it is to be understood that those skilled in the art will no doubt devise certain alterations and modifications in form and detail that nevertheless include the true spirit and scope of the invention. It is therefore intended that the following claims cover all such alterations and modifications, in form and detail, that nevertheless include the true spirit and scope of the invention.

What we claim is:

1. A method for determining the track width of magnetoresistive sensors of magnetic heads fabricated upon the surface of a wafer substrate, comprising the steps of:
    fabricating two different sensors on said substrate having known design widths and heights;
    fabricating two different elements on said substrate having known design widths and heights;
    determining a change in electrical resistance values of said two sensors and said two elements while applying a magnetic field thereto;
    determining the actual track width of said sensors from said change in electrical resistance values and said known design widths and heights of said sensors and said elements.

2. A method for determining the track width of magnetoresistive sensors as described in claim 1 wherein a mathematical analysis is performed to determine said actual track width of said sensors, and wherein it is assumed in said mathematical analysis that the windage in the widths of said sensors and said elements is the same value.

3. A method for determining the track width of magnetoresistive sensors as described in claim 2 wherein said two elements are ELGs.

4. A method for determining the track width of magnetoresistive sensors of magnetic heads fabricated upon the surface of a wafer substrate, comprising the steps of:
    fabricating magnetoresistive sensors on a wafer surface, said sensors having at least two different stripe heights;
    fabricating other magnetoresistive elements on said wafer surface, said elements having at least two different stripe heights;
    determining a change in electrical resistance of two said sensors having different stripe heights while applying a magnetic field to said sensors;
    determining a change in electrical resistance of two said elements having different stripe heights while applying a magnetic field to said elements;
    determining the actual track width of said sensors by use of mathematical equations that utilize the values of said change in electrical resistance of said sensors and said elements.

5. A method for determining the track width of magnetoresistive sensors as described in claim 4 wherein it is assumed in said mathematical equations that the windage in the width of said elements and the windage in the width of said sensors is the same value.

6. A method for determining the track width of magnetoresistive sensors as described in claim 5 wherein two different sensors are fabricated upon said wafer surface and two different elements are fabricated upon said wafer surface.

7. A method for determining the track width of magnetoresistive sensors as described in claim 6 wherein said two different elements are both ELGs.

8. A method for determining the track width of magnetoresistive sensors as described in claim 4 wherein two different sensors (S1 and S2) are fabricated upon said wafer surface, said sensors having the same design width $W_S$ and fabrication width windage $\delta$, and said sensors S1 and S2 having different stripe heights $H_{S1}$ and $H_{S2}$ and having the same fabrication height windage $\Delta H_S$;

and wherein two different elements ($E_1$ and $E_2$) are fabricated upon said wafer surface, said elements being ELGs having the same design width $W_E$ and having the same fabrication width windage $\delta$, and said elements $E_1$ and $E_2$ having different stripe heights $H_{E1}$ and $H_{E2}$ and having the same fabrication height windage $\Delta H_E$;

and wherein said change in electrical resistance of said sensors (S1 and S2) is determined to be $\Delta R_{S1}$ and $\Delta R_{S2}$ respectively;

and wherein said change in electrical resistance of said ELGs ($E_1$ and $E_2$) is determined to be $\Delta R_{E1}$ and $\Delta R_{E2}$;

and wherein said actual track width $TW_S$ of said sensors (S1 and S2) is $TW_S = W_S + \delta$ wherein $\delta$ is determined from mathematical equations that utilize the values $W_S$, $W_E$, $H_{S1}$, $H_{S2}$, $H_{E1}$, $H_{E2}$, $\Delta R_{S1}$, $\Delta R_{S2}$, $\Delta R_{E1}$ and $\Delta R_{E2}$.

9. A method for determining the track width of magnetoresistive sensors as described in claim 8 wherein $\delta$ is determined from the equation:

$$\delta = (W_S - \beta W_E)/(\beta - 1)$$

and wherein $\beta$ is determined from the equation:

$$\beta = \Delta R_{S1}(H_{S1} + \Delta H_S)/\Delta R_{E1}(H_{E1} + \Delta H_E)$$

and wherein $\Delta H_S$ is determined from the equation:

$$\Delta H_S = (H_{S2}\Delta R_{S2} - H_{S1}\Delta R_{S1})/(\Delta R_{S1} - \Delta R_{S2})$$

and wherein $\Delta H_E$ is determined from the equation:

$$\Delta H_E = (H_{E2}\Delta R_{E2} - H_{E1}\Delta R_{E1})/(\Delta R_{E1} - \Delta R_{E2}).$$

10. A method for determining the track width of magnetoresistive sensors as described in claim 8, wherein two said sensors S1 and two said sensors S2, and said two ELGs E1 and E2 comprise a cell upon said wafer surface, and wherein said electrical resistance determinations are conducted on sensors and ELGs within said cell, and wherein said actual track width is the actual track width of said sensors within said cell.

11. A method for determining the track width of magnetoresistive sensors as described in claim 10, wherein a plurality of cells are formed on said wafer surface, and a plurality of actual track width determinations are performed on various ones of said cells, such that actual track width measurements of magnetoresistive sensors are made at various cell locations throughout said wafer surface.

* * * * *